March 8, 1966 P. P. THOMAS 3,238,567
INJECTION MOLDING MACHINE
Filed May 13, 1963 3 Sheets-Sheet 1

INVENTOR.
Paul P. Thomas.
BY
Barnard, McGlynn & Leising
ATTORNEYS

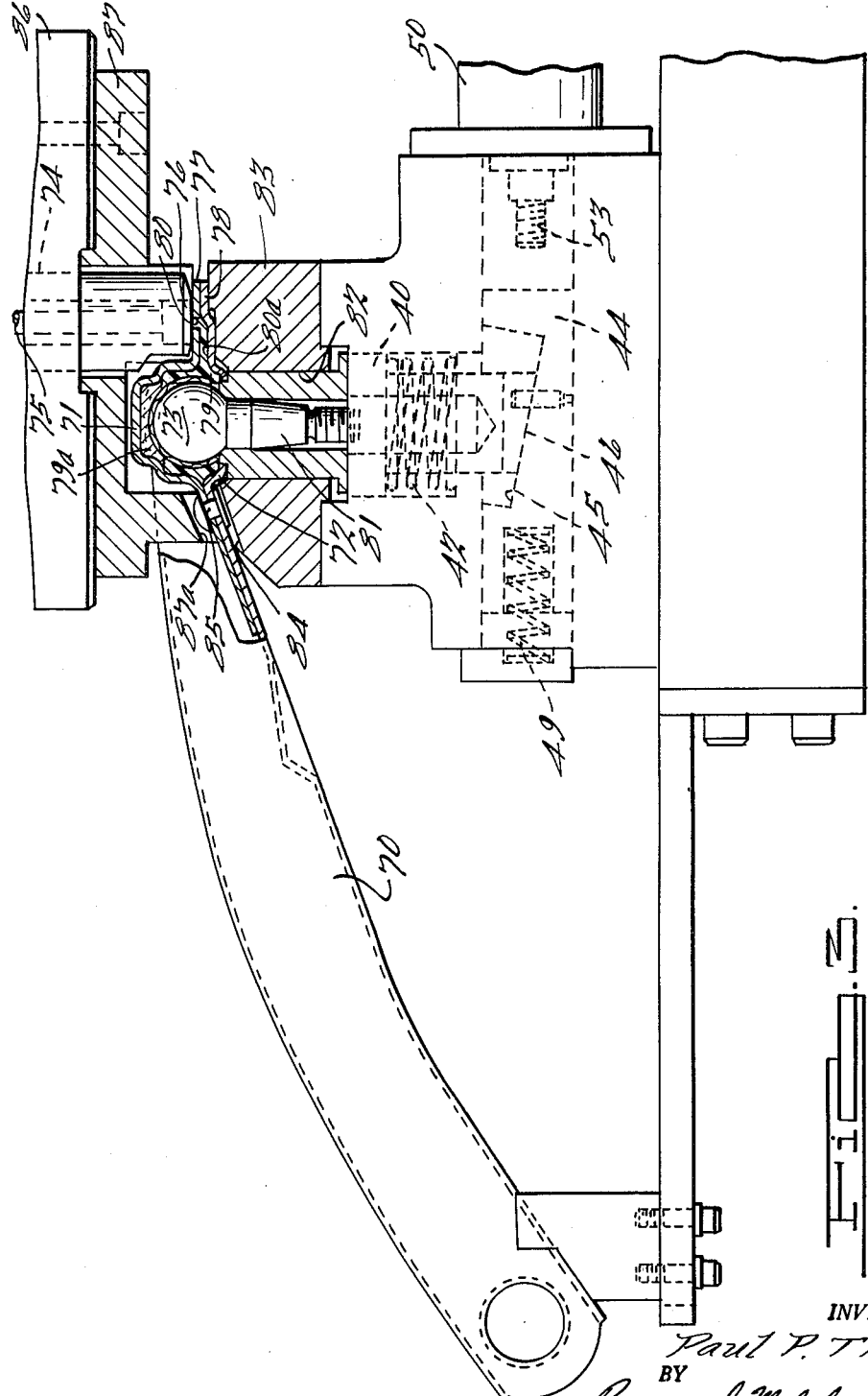

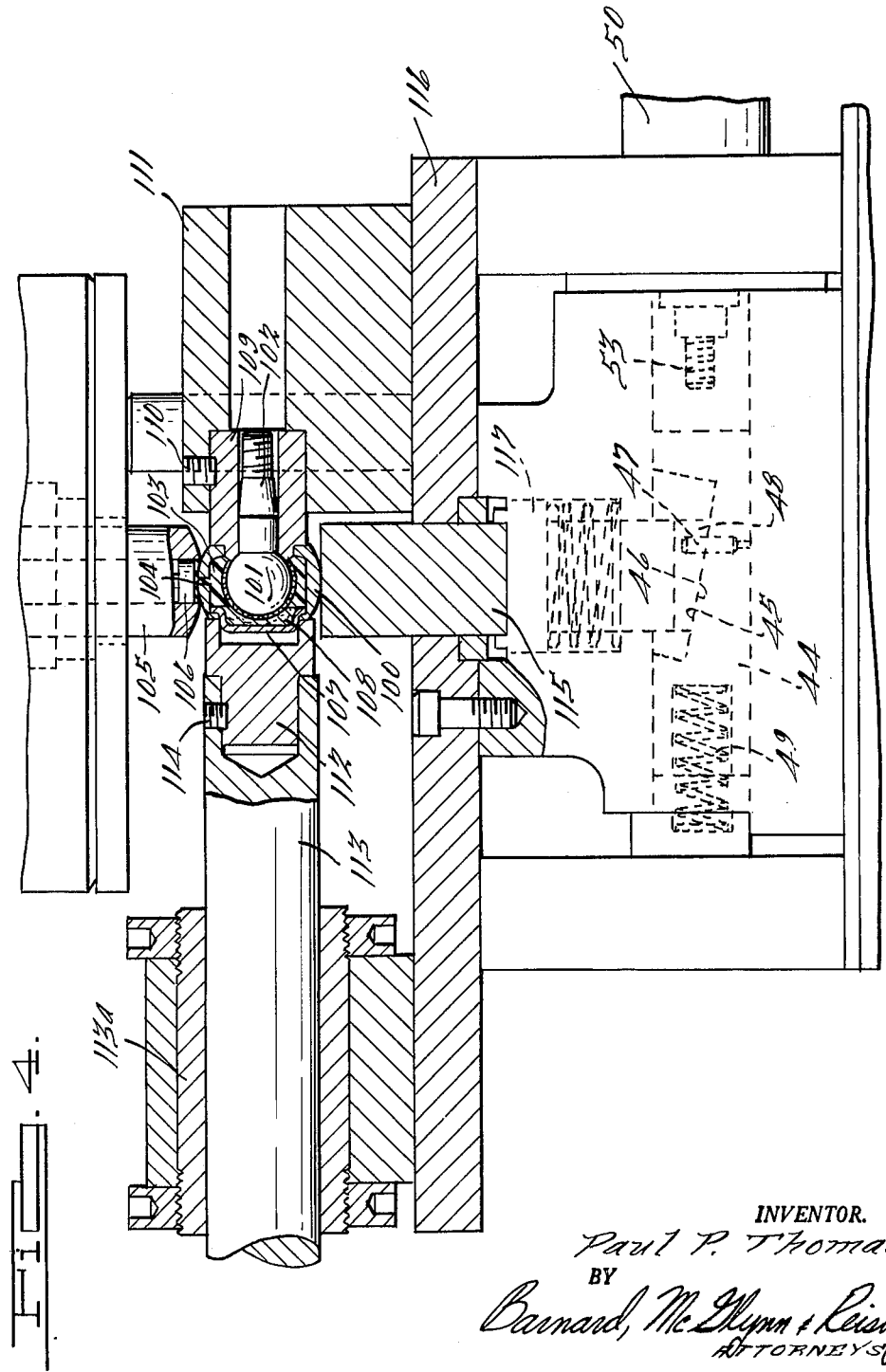

United States Patent Office 3,238,567
Patented Mar. 8, 1966

3,238,567
INJECTION MOLDING MACHINE
Paul P. Thomas, Bremen, Germany, assignor to American Metal Products Company, Detroit, Mich., a corporation of Michigan
Filed May 13, 1963, Ser. No. 279,837
7 Claims. (Cl. 18—30)

This invention relates to injection machines and, more particularly, to devices of this type adapted to inject an antifriction material in the space between the socket and ball of a ball and socket joint.

In units such as ball and socket joints, the socket is usually formed of two sections having semispherical recesses with peripheral flanges which are joined or united by spot welding or the like to form the socket. Sometimes, the union between these peripheral flanges is not complete throughout, whereby the antifriction material, which is injected under pressure, escapes.

It is therefore an important object of this invention to provide an injection machine which not only seals the injection nozzle of the macine about an aperture in the socket, but also clamps or presses the flanges of the socket together to prevent the escape of the injected material.

Another object of the invention is to provide a readily releasable means for operatively positioning the adapter or other fixture which supports the ball and socket joint during the injection operation, whereby these parts may be rapidly separated for removing the completed unit and inserting a new unit.

The device of this invention constitutes an improvement upon the injection machine shown in the patent to White, Number 2,961,704, dated November 29, 1960.

The various objects and advantages, and the novel details of construction of several commerically practical embodiments of the invention, will become more apparent as this description proceeds, espectially when considered in connection with the accompanying drawings, in which:

FIGURE 3 is a view similar to FIGURE 2 showing a modified form of construction; and FIGURE 4 is a view similar to FIGURE 2 showing another modified form of construction.

Figure 1:
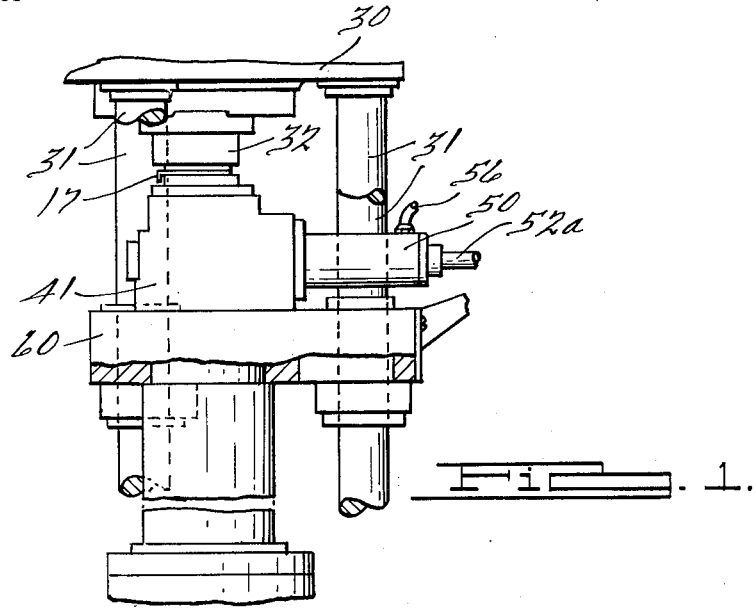
FIGURE 1 is a fragmentary elevational view of a device constructed in accordance with this invention.

This invention relates to improvements in the type of injection machine shown in the patent to C. S. White, No. 2,961,704, dated November 29, 1960. In injection machines of this type, there is provided a hollow piston rod 10 adapted to be moved into engagement with the workpiece by a piston (not shown). Slidably mounted within the piston rod 10 is a plunger 11 having a head 12 adapted to inject an antifriction material 13 into the workpiece through an aperture formed in the outer portion thereof. The plunger 11 and the piston rod 10 may be actuated as shown and described in the aforesaid patent, No. 2,961,704.

In the present instance, the workpiece consists of a ball and socket element consisting of two socket sections 14 and 15, at least one of which is formed with a semispherical recess. The socket sections 14 and 15 are provided with peripheral flanges 16 and 17, respectively, which are secured together by spot welding or the like. The element further consists of a ball 18 having the usual stud or stem 19. With the machine of the above-mentioned patent, an antifriction material 13 is injected in the space between the socket member and the ball through an aperture 20 formed in the socket member.

Figure 2:
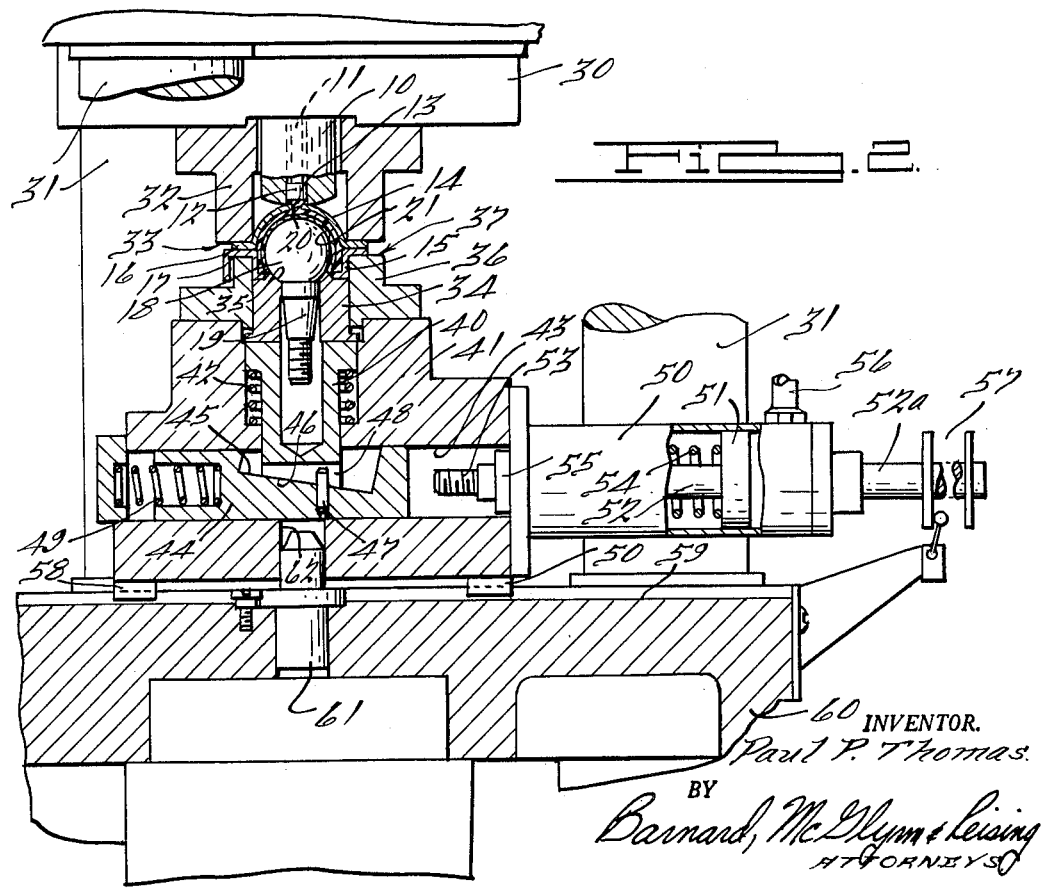
FIGURE 2 is an enlarged sectional elevational view of a portion of the structure shown in FIGURE 1.

As seen best in FIGURE 2, the end of the piston rod 10 engages to top of the socket in an area surrounding the aperture 20 with a predetermined pressure sufficient to insure a seal therewith.

Thus, the antifriction material 13 may be injected into the space between the socket and ball to completely fill the same, as described in the aforesaid patent.

A cap 21 of low-friction cloth-like material is usually, although not necessarily, applied to the ball 18. This cap may be constructed and appiled to the ball in the manner described in copending application of Charles S. White Serial No. 855,896, filed November 27, 1959, and now abandoned.

The antifriction material employed may be of any preferred or desired type such, for instance, as described in the aforesaid White patent, No. 2,961,704. The antifriction material 13 is injected into the space between the socket and the ball under considerable pressure, and sometimes the union between the peripheral flanges of the socket is not complete throughout, whereby the injected antifriction material escapes. It is, therefore, an important object of this invention to provide an injection machine which not only seals the injection nozzle of the machine about the aperture in the socket, but also clamps or presses the flanges of the socket together to prevent the escape of the injected material.

For accomplishing this, the machine of the present invention also includes a ram 30 which is reciprocal on rods 31 by means not shown. The ram 30 carries an annular collar-like plunger 32, the free end 33 of which is adapted to engage the top of the upper peripheral flange of the ball and socket unit. The ball and socket unit is mounted on an adapter 34 in which the stem 19 of the ball and socket unit extends, as shown in FIGURE 2. The ball 18 of the ball and socket unit rests upon a truncated semispherical portion 35 of the adapter 34, which also acts as a stop for the injected antifriction material 13. Surrounding the adapted 34 is an annular collar 36, the upper edge 37 of which engages the underside of the peripheral flange 17. Thus, the ends 33 and 37 of the members 32 and 36 engage the peripheral flanges of the socket member to clamp the same together during the injection operation. This forms a tight joint or union between these parts to prevent the escape of the injected material out between these peripheral flanges, as will be apparent.

In order to hold the adapter 34 in operative position during the injection operation and, at the same time, maintain the same so as to facilitate removal of the ball and socket unit, the device of this invention comprises means for movable supporting the adapter 34. This means consists of a sleeve-like plunger 40 slidably mounted in a frame member 41 and normally urged in an upward direction by means of a spring 42. The lower end of the plunger 40 extends into a traversely extending bore or opening 43 formed in the housing 41. Slidably mounted in the opening or bore 43 is a cam member 44 having a cam surface 45 adapted to engage a cam surface 46 on the lower end of the plunger 40. A guide pin 47 carried by the cam member 44 projects into a slot 48 formed in the lower end of the plunger 40 to keep the plunger 40 from rotating and thus keep the cam surfaces 45 and 46 in alignment.

The cam member 44 is normally urged to the right, as viewed in FIGURE 2, by means of a spring 49. In this position, the cam surface 45, in engagement with the cam surface 46 on the plunger 40, holds or locks the plunger 40 in the position shown in FIGURE 2, to support the adapter 34 in the position shown and thus holds the ball and socket unit in position during the injection operation. In order that the parts may be quickly and readily released, the apparatus comprises a cylinder 50 in which a piston 51 operates. The piston is provided with a piston rod 52 and on the inner end of this piston rod is an adjustable stud 53 adapted in one position of the piston to engage the cam member 44 to move the same from the position shown in FIGURE 2 to a position further to the left whereupon the pressure on the plunger 40 is released and the removal of the ball and socket unit is facilitated. The piston 51 is urged to the position shown in FIGURE 2 by means of a spring 54, movement toward the right of the piston rod being limited by a collar 55 thereon which engages the end of the cylinder 50. Fluid is supplied to the cylinder 50 by means of a supply conduit 56 to force the piston rod to the left, as viewed in FIGURE 2. If desired, a limit switch 57 may be actuated by the extending end 52a of the piston rod to control other operations of the apparatus.

In order to facilitate the alignment of the adapter 34 and the associated structure with the piston rod 10 and ram 30, the housing 41 may be keyed by keys 58 to ways 59 formed in the base 60 of the apparatus. The housing 41 may be held in proper alignment by means of an aligning pin 61 mounted in the base 60 and extending into an aperture 62 in the housing.

With the apparatus thus far described, it will be noted that the piston rod 10 is first engaged with the top of the socket in the area surrounding the aperture 20 formed therein. This engagement is a sealing engagement so as to prevent the escape of the antifriction material. The ram 30 is then actuated to bring the collar-like plunger 32 into engagement with the upper peripheral flange of the socket of the ball and socket unit which has previously been mounted on the adapter, as shown in FIGURE 2. The lower peripheral flange of the ball and socket unit rests on the edge 37 of the collar 36. This tightly clamps the peripheral flanges of the socket member together to prevent the escape of the injected material. After the injection operation, the piston 51 is actuated to release the cam member 44 and thus remove the pressure on the adapter 34 so that the ball and socket unit may be readily removed and a new one inserted preparatory to the next injection operation.

In the form of construction shown in FIGURE 3, the apparatus forming the subject matter of this invention is illustrated as injecting and antifriction material into a ball and socket unit formed on the end of an A-frame member 70, such as used in auotomobiles or the like. In this form of construction, the socket consists of an upper socket member 71 and a lower socket member 72 surrounding the ball 73 of the ball and socket joint. The reference character 74 indicates the hollow piston rod, similar to the piston rod 10, and the reference character 75 indicates the plunger, similar to the plunger 11, having a head 76. The peripheral flange on the upper socket member is indicated by the reference character 77 and the flange on the lower socket member is indicated by the reference character 78. The latter may be and preferably is part of the A-frame arm, as illustrated. The reference character 79 indicates the antifriction material which is adapted to be injected into the space between the socket member and ball through an aperture 80 formed in the upper flange 76 of the socket member. Communication with the space between the ball and socket members is provided by means of a channel 80a formed in one or both of the flanges of the socket member. In this form of construction, the antifriction material is inserted from the side of the ball and socket unit, instead of from an aperture in the top thereof, as in the previously described construction. In this form of construction, a pad 79a of resilient material may be inserted in part of the space between the ball and socket and the remaining space filled with the antifriction material 79. The reference character 81 indicates the stem of the ball and socket member which is received in an adapter 82. The adapter rests upon and is supported by a sleeve-like plunger 40, the same as the plunger in the previously described construction. In this form of construction, a collar 83 surrounds the adapter 82 and engages the lower socket part 72. This collar is cut away as at 84 to accommodate the rivet 85 which secures the top socket part to the assembly. The ram 86 carries the member 87 which is adapted to engage the flange 77 of the upper socket part 71 so that the flanges of these socket parts may be clamped between the members 87 and 83, as in the previously described construction. The member 87 is cut away as at 87a to clear the rivet 85.

The remaining portion of the structure involving the locking cam 44 and its associated parts is the same as previously described.

From the foregoing, it will be noted that the antifriction material 79 is injected through the top peripheral flange 76 of the socket member through the aperture 80 and the channel 80a formed therein, and that the flanges of the socket member are clamped together to prevent the escape of the injected material during the injection operation.

In the form of construction illustrated in FIGURE 4, the ball and socket unit is shown as comprising an outer shell 100 and a ball 101 on the end of a stud or stem 102. The space between the ball 101 and the socket portion 100 is adapted to contain an antifriction material 103 adapted to be injected therein through an aperture 104 through a hollow piston rod 105 by means of a plunger 106, similar to the previously described constructions. The socket member 100 is provided with a cap 107 and interposed between the cap and the ball is a layer of resilient material 108, such as rubber or the like.

The stud or stem 102 of the ball and socket unit is received in an adapter 109 which is secured by a set screw 110 to a frame member 111 forming part of the apparatus. The ball and socket unit is held tightly in the adapter 109 by means of a plunger 112 carried by a piston rod 113 reciprocated by a cylinder and piston means (not shown) and slidable in a bearing 113a. The plunger may be secured to the piston rod 113 by means of a set screw 114.

The ball and socket unit is releasably held in position by means of a plunger-like member 115 slidably mounted in the base 116 of the machine. The plunger 115 is urged upwardly by means of another plunger 117, similar to the plunger 40, as described in connection with FIGURE 2. In this form of construction, the cam means for controlling the plunger 117 is the same as described in the form of construction illustrated in FIGURE 2 and similar reference characters have been applied to these parts.

In this form of construction, it will be noted that the plunger-like member 115 and the cam means act to releasably hold the ball and socket unit in position against the pressure of the hollow piston rod 105 during the injection operation, but that this holding means may be readily released to facilitate the removal of the ball and socket unit after completion of the injection operation.

While several commercially practical embodiments of the invention have been described and illustrated herein somewhat in detail, it will be understood that various changes may be made as may come within the purview of the accompanying claims.

What is claimed is:

1. An antifriction bearing making machine for injecting a material through an aperture in the socket into the cavity between the socket and ball of a ball and socket element, the socket being formed with semispherical recesses provided with peripheral flanges comprising, a hollow piston rod having an annular seat on one end thereof adapted to seat on said socket around the aperture therein, a plunger slidably mounted in said piston rod for injecting said material into said cavity, supporting means for said element, including an adapter and a collar engaging one side of said peripheral flanges, said adapter being resiliently biased against said element, and means engaging the other side of said flanges to clamp said flanges together to prevent the escape of the injected material.

2. An antifriction bearing making machine for injecting a material through an aperture in the socket into the cavity between the socket and ball of a ball and socket element, the socket being formed with semispherical recesses provided with peripheral flanges comprising, a hollow piston rod having an annular seat on one end thereof adapted to seat on said socket around the aperture therein, a plunger slidably mounted in said piston rod for injecting said material into said cavity, supporting means for said element including an adapter and an annular collar surrounding said adapter and engaging the underside of said peripheral flanges, biasing means engaging said adapter for urging said adapter toward said element, and an annular member engaging the other side of said peripheral flanges to clamp said flanges together to prevent the escape of the injected material.

3. An antifriction bearing making machine for injecting a material through an aperture in the socket into the cavity between the socket and ball of a ball and socket element, the socket being formed with semispherical recesses provided with peripheral flanges comprising, a hollow piston rod having an annular seat in one end thereof adapted to seat on said socket around the aperture therein, a plunger slidably mounted in said piston rod for injecting said material into said cavity, supporting means for said element including an adapter and an annular collar surrounding said adapter and engaging the underside of said peripheral flanges, a spring engaging said adapter and normally urging said adapter toward said element, a ram, and an annular member actuated by said ram engaging the other side of said peripheral flanges to clamp said flanges together to prevent the escape of the injected material.

4. An antifriction bearing making machine for injecting a material through an aperture in the socket into the cavity between the socket and ball of a ball and socket element, the socket being formed with semispherical recesses provided with peripheral flanges comprising, a hollow piston rod having an annular seat in one end thereof adapted to seat on said socket around the aperture therein, a plunger slidably mounted in said piston rod for injecting said material into said cavity, supporting means for supporting said element adjacent said piston rod and including an adapter, an annular collar surrounding said adapter and said annular collar engaging the underside of said peripheral flanges, a spring pressed member engaging said adapter normally urging said adapter toward said element to bias said element against said piston, cam means for engaging and holding said member in said position, and means for actuating said cam means.

5. An antifriction bearing making machine of the class described for injecting a material through an aperture in the socket into the cavity between the socket and ball of a ball and socket element, comprising, a hollow piston rod having an annular seat on one end thereof adapted to seat on said socket around the aperture therein, a plunger slidably mounted within said piston rod for forcing said material into said cavity to fill the same, supporting means for supporting said element against said piston, a spring pressed member engaging said element for urging said element toward the seat on said piston rod and for blocking the flow of injected material from said cavity, cam means for engaging and holding said member in said position, and means for actuating said cam means.

6. An antifriction bearing making machine of the class described for injecting a material through an aperture in the socket into the cavity between the socket and ball of a ball and socket element, comprising, a hollow piston rod having an annular seat on one end thereof adapted to seat on said socket around the aperture therein, a plunger slidably mounted within said piston rod for forcing said material into said cavity to fill the same, supporting means for supporting said element adjacent said piston rod, a spring pressed member engaging said element for urging said element toward the seat on said piston rod and for blocking the flow of the injected material from said cavity, cam means for engaging and holding said member in said position, spring means operatively connected to said cam means for urging said cam means in one direction, and plunger means operatively connected to said cam means for moving said cam means in the opposite direction.

7. An antifriction bearing making machine for injecting a material through an aperture in the socket into the cavity between the socket and ball of a ball and socket element, the socket being formed with semispherical recesses provided with peripheral flanges, said aperture being formed in one of said peripheral flanges and communicating with said cavity by a laterally extending channel, comprising, a hollow piston rod having an annular seat in one end thereof adapted to seat on said flange around the aperture therein, a plunger slidably mounted in said piston rod for injecting said material into said cavity, supporting means for said element engaging the underside of said peripheral flanges and including an adapter, said adapter engaging said element and blocking flow of the injected material from said cavity and an annular collar surrounding said adapter, a spring pressed member engaging said adapter normally urging said adapter toward said element, cam means for engaging and holding said member in said position, and means for actuating said cam means.

References Cited by the Examiner

UNITED STATES PATENTS

| | | | |
|---|---|---|---|
| 2,324,978 | 7/1943 | Lohrand et al. | 18—36 |
| 2,470,402 | 5/1949 | Jobst | 18—42 |
| 2,688,159 | 9/1954 | Swartz et al. | 18—2 |
| 2,798,255 | 7/1957 | Winters | 18—36 |
| 2,961,704 | 11/1960 | White | 18—30 |
| 3,098,263 | 7/1963 | Campbell | 264—242 |

J. SPENCER OVERHOLSER, *Primary Examiner.*

ROBERT F. WHITE, *Examiner.*